(12) United States Patent
Yokoyama et al.

(10) Patent No.: US 8,349,448 B2
(45) Date of Patent: Jan. 8, 2013

(54) PRESSURE-SENSITIVE ADHESIVE SHEET

(75) Inventors: Junji Yokoyama, Ibaraki (JP); Shinji Inokuchi, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 781 days.

(21) Appl. No.: 12/138,164

(22) Filed: Jun. 12, 2008

(65) Prior Publication Data

US 2008/0311369 A1 Dec. 18, 2008

(30) Foreign Application Priority Data

Jun. 13, 2007 (JP) ................................ 2007-156005

(51) Int. Cl.
*B32B 7/12* (2006.01)
(52) U.S. Cl. ....... 428/354; 428/343; 428/40.1; 428/220; 428/41.7; 428/41.8; 428/542.2; 428/543; 428/40.8; 428/40.9; 428/411.1; 428/195.1
(58) Field of Classification Search .................. None
See application file for complete search history.

(56) References Cited

U.S. PATENT DOCUMENTS

| | | | | | |
|---|---|---|---|---|---|
| 4,780,391 | A | * | 10/1988 | Hiraishi et al. | 430/138 |
| 7,399,527 | B2 | * | 7/2008 | Miyano et al. | 428/354 |
| 7,402,336 | B2 | * | 7/2008 | Yokoyama et al. | 428/354 |
| 2004/0028895 | A1 | * | 2/2004 | Yamakami et al. | 428/354 |
| 2004/0076768 | A1 | * | 4/2004 | Kamiya et al. | 428/1.1 |
| 2004/0121148 | A1 | * | 6/2004 | Miyano et al. | 428/354 |
| 2005/0163995 | A1 | * | 7/2005 | Yokoyama et al. | 428/343 |
| 2006/0035077 | A1 | * | 2/2006 | Husemann et al. | 428/354 |
| 2007/0196647 | A1 | * | 8/2007 | Yokoyama et al. | 428/355 AC |

FOREIGN PATENT DOCUMENTS

| | | | |
|---|---|---|---|
| EP | 1795567 A2 | | 6/2007 |
| EP | 2003179 A1 | * | 12/2008 |
| JP | 08-151557 A | | 6/1996 |
| JP | 11-105201 A | | 4/1999 |
| JP | 2002-23663 A | | 1/2002 |
| JP | 2002-67207 A | | 3/2002 |
| JP | 2002-235053 A | | 8/2002 |
| JP | 2002-249741 A | | 9/2002 |
| JP | 2002-350612 A | | 12/2002 |
| JP | 2004-53759 A | | 2/2004 |
| JP | 2004-59723 A | | 2/2004 |
| JP | 2004-156015 A | | 6/2004 |
| JP | 2004-161955 A | | 6/2004 |
| JP | 2004-184443 A | | 7/2004 |
| JP | 2004-231736 A | | 8/2004 |
| JP | 2004-231737 A | | 8/2004 |
| JP | 2004-244499 A | | 9/2004 |
| JP | 2005-126624 A | | 5/2005 |
| JP | 2005-213282 A | | 8/2005 |
| JP | 2006-10931 A | | 1/2006 |
| JP | 2007-9137 A | | 1/2007 |
| JP | 2007-23089 A | | 2/2007 |

OTHER PUBLICATIONS

Masayuki Egami and Naoki Fujino, "Mulch Film for Agriculture", English translation of JP 2003-38046, publication date Jul. 27, 2001.*
Japanese Office Action issued on Jul. 3, 2012 by the Japanese Patent Office in counterpart Japanese Application No. 2007-156005.

* cited by examiner

*Primary Examiner* — Jennifer Chriss
*Assistant Examiner* — Anish Desai
(74) *Attorney, Agent, or Firm* — Sughrue Mion, PLLC

(57) ABSTRACT

The present invention relates to a pressure-sensitive adhesive sheet including: a laminated structure in which a light-shielding layer, a white or silver layer, and a colored layer are laminated in this order; and at least one pressure-sensitive adhesive layer as at least one surface layer, in which at least one surface of the pressure-sensitive adhesive sheet has L* of 30 or more and C* of 3 or more, L* representing a luminosity and C* representing a chromaticness, and in which the pressure-sensitive adhesive sheet as a whole has a transmittance of a light having a wavelength of 550 nm of 0.3% or less. The pressure-sensitive adhesive sheet of the invention is excellent in light-shielding property irrespective of the thinness thereof as well as in decorativity due to the surface thereof that is colored with a bright color.

5 Claims, 1 Drawing Sheet

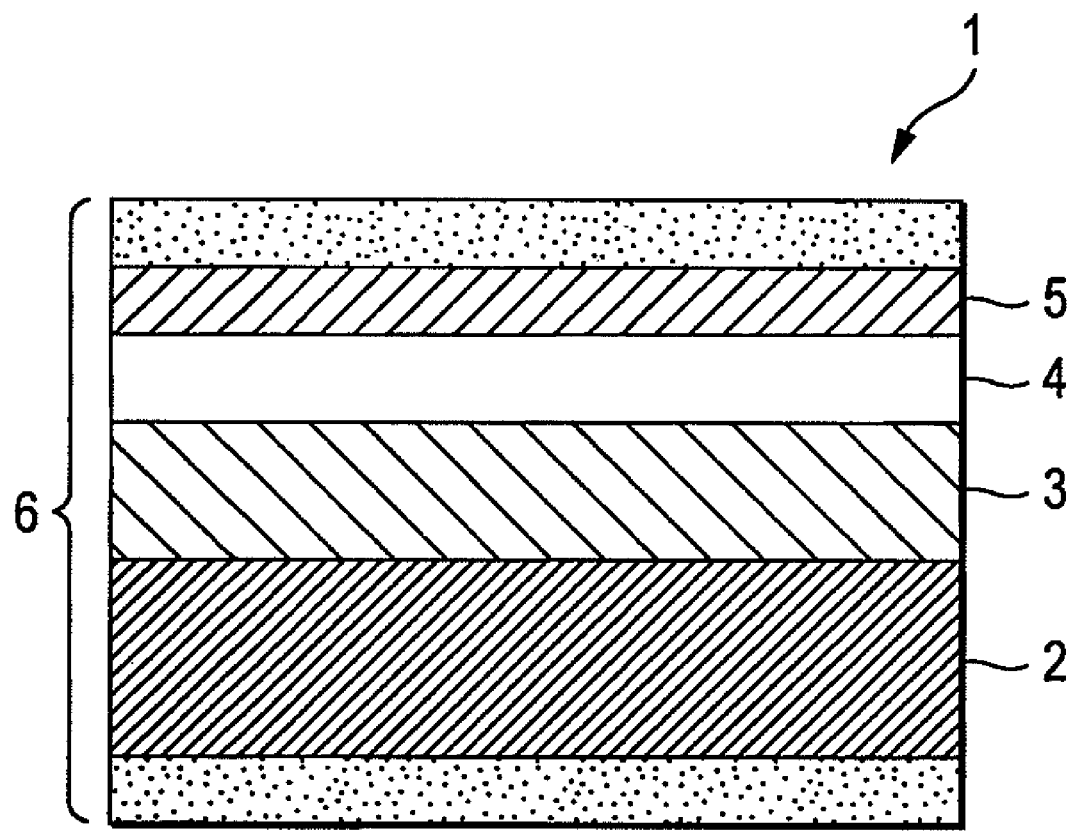

PRESSURE-SENSITIVE ADHESIVE SHEET

FIELD OF THE INVENTION

The present invention relates to a pressure-sensitive adhesive sheet. More specifically, it relates to a pressure-sensitive adhesive sheet excellent in light-shielding property irrespective of the thinness thereof as well as in decorativity due to the surface thereof that is colored with a bright color.

BACKGROUND OF THE INVENTION

Recently, decoration on a surface of a housing of a mobile phone or a portable game console by attaching to the surface a decoration sheet on which a pattern or the like is printed has been carried out. For attaching such a decoration sheet, a pressure-sensitive adhesive sheet such as a double-sided pressure-sensitive adhesive sheet has been generally used.

In recent years, a liquid crystal display (LCD) is often provided on housings of mobile phones, and a pressure-sensitive adhesive sheet to be used for such housings is required to have a light-shielding property from the viewpoints of prevention of stray light from the LCD to thereby improve surface decorativity.

As the pressure-sensitive adhesive sheet having a light-shielding property which satisfies the above-described requirements, pressure-sensitive adhesive sheets (including tape) having a black light-shielding layer have been known (see Patent References 1 to 13, for example). However, along with thickness reduction of mobile phones, the decoration sheet and the pressure-sensitive adhesive sheet have been thinned. Consequently, in the case of using such pressure-sensitive adhesive sheets having the light-shielding layer, a problem of deteriorations in designability and decorativity has occurred due to a phenomenon that the black light-shielding layer is seen through a surface of the decorative sheet.

Patent Reference 1: JP-A-2004-59723
Patent Reference 2: JP-A-2005-213282
Patent Reference 3: JP-A-2007-9137
Patent Reference 4: JP-A-2002-235053
Patent Reference 5: JP-A-2002-350612
Patent Reference 6: JP-A-2004-161955
Patent Reference 7: JP-A-2004-184443
Patent Reference 8: JP-A-2004-231736
Patent Reference 9: JP-A-2004-156015
Patent Reference 10: JP-A-2004-244499
Patent Reference 11: JP-A-2002-249741
Patent Reference 12: JP-A-2004-053759
Patent Reference 13: JP-A-2002-023663

SUMMARY OF THE INVENTION

Accordingly, an object of the invention is to provide a pressure-sensitive adhesive sheet which is excellent in light-shielding property irrespective of the thinness thereof, free from influence of a shielding layer exerted on the surface thereof, and capable of imparting excellent decorativity to an adherend.

The inventors have conducted intensive studies to find that it is possible to obtain a pressure-sensitive adhesive sheet capable of expressing a bright color on a surface thereof while keeping an excellent light-shielding property even when the pressure-sensitive adhesive sheet is thinned by providing a white or silver layer on a shielding layer and further providing a colored layer thereon, whereby the invention has been thus completed.

That is, the present invention provides the following (1) to (4).

(1) A pressure-sensitive adhesive sheet comprising:
a laminated structure in which a light-shielding layer, a white or silver layer, and a colored layer are laminated in this order; and
at least one pressure-sensitive adhesive layer as at least one surface layer,
wherein at least one surface of the pressure-sensitive adhesive sheet has $L^*$ of 30 or more and $C^*$ of 3 or more, in which $L^*$ represents a luminosity and $C^*$ represents a chromaticness, and
wherein the pressure-sensitive adhesive sheet as a whole has a transmittance of a light having a wavelength of 550 nm of 0.3% or less.

(2) The pressure-sensitive adhesive sheet according to (1), wherein the laminated structure has a structure in which a white or silver reflective layer, a light-shielding layer, a white or silver layer, and a colored layer are laminated in this order.

(3) The pressure-sensitive adhesive sheet according to (1), which has a thickness of 10 to 50 μm.

(4) The pressure-sensitive adhesive sheet according to (2), which has a thickness of 10 to 50 μm.

According to the pressure-sensitive adhesive sheet of the invention, it is possible to prevent stray light from an LCD owing to the excellent shielding property thereof. Furthermore, although the pressure-sensitive adhesive sheet is thin, since the surface of the pressure-sensitive adhesive sheet is free from influence of the light-shielding layer, the surface can be a bright color surface. Therefore, the pressure-sensitive adhesive sheet is useful in the case of attaching a decoration sheet since the pressure-sensitive adhesive sheet does not impair decorativity of the decoration sheet.

BRIEF DESCRIPTION OF THE DRAWINGS

FIG. 1 is a schematic sectional view showing one embodiment of the pressure-sensitive adhesive sheet of the invention.

DESCRIPTION OF SYMBOLS

| | |
|---|---|
| 1 | pressure-sensitive adhesive sheet |
| 2 | base material |
| 3 | light-shielding layer (black layer) |
| 4 | white or silver layer |
| 5 | colored layer |
| 6 | pressure-sensitive adhesive layer |

DETAILED DESCRIPTION OF THE INVENTION

Hereinafter, embodiments of the invention will be described in detail with reference to the drawings as required.

A pressure-sensitive adhesive sheet of the invention includes: a laminated structure in which a light-shielding layer, a white or silver layer, and a colored layer are laminated in this order; and at least one pressure-sensitive adhesive layer (adhesive layer) as at least one surface layer. In addition to the laminated structure and the pressure-sensitive adhesive layer, a resin layer (a film layer or a coating layer), a metal vapor deposition layer, and the like may be provided. Further, the pressure-sensitive adhesive sheet of the invention may be a single-sided pressure-sensitive adhesive sheet having an pressure-sensitive adhesive layer on one side of a base material or may be a double-sided pressure-sensitive adhesive sheet having pressure-sensitive adhesive layers formed on both sides of a base material. Furthermore, the pressure-sensitive adhesive sheet may be a double-sided pressure-sensitive adhesive sheet having no base material, which does not have any base material and is formed only of a pressure-sensitive adhesive layer (multilayered pressure-sensitive adhesive layer) or of a pressure-sensitive adhesive layer and a vapor deposition layer and/or a printed layer. Among them, the pressure-sensitive adhesive sheets having a base material (single-sided or double-sided pressure-sensitive adhesive sheets) are more preferable from the view points of handling property, processability, and the like. Incidentally, the base material may be one or two layers of the light-shielding layer, the white or silver layer, and the colored layer, or may be a layer provided separately from the above layers. As used herein, the pressure-sensitive adhesive sheet includes those in the form of a tape, i.e. a pressure-sensitive adhesive tape.

FIG. 1 is a schematic sectional view showing one embodiment of the pressure-sensitive adhesive sheet (double-sided pressure-sensitive adhesive sheet) of the invention. In the embodiment shown in FIG. 1, a light-shielding layer 3, a white or silver layer 4, and a colored layer 5 are provided on one side of a base material 2 in this order. A pressure-sensitive adhesive layer 6 may be provided only on one side of the pressure-sensitive adhesive sheet.

A separator (peel-off liner) may be attached to an adhesive surface of the pressure-sensitive adhesive sheet until the use of the pressure-sensitive adhesive sheet for the purpose of protection of the adhesive surface.

Light-Shielding Layer

The light-shielding layer in the pressure-sensitive adhesive sheet of the invention is used as a layer for shielding light transmission and, in the case of attaching the pressure-sensitive adhesive sheet to a surface (in the vicinity of an LCD) of a mobile phone having the LCD, it has a role of shielding stray light from the LCD below the pressure-sensitive adhesive sheet to prevent deterioration of designability of a decoration film to be attached to the surface of the mobile phone. A transmittance of the light-shielding layer of the invention is not particularly limited and may preferably be 0.3% or less (0 to 0.3%), more preferably 0.1% or less, further more preferably 0.05% or less, and still more preferably 0.03% or less (particularly 0.01% or less).

In the present invention, a black layer showing black may preferably be used as the light-shielding layer. In the black layer, black means a blackish color having L* defined in L*a*b* color space of less than 30 (preferably 27 or less, more preferably 25 or less). It is possible to select each of a* and b* defined in L*a*b* color space depending on a value of L*. Each of a* and b* may preferably be, for example, in the range of −10 to 10, more preferably −5 to 5, still more preferably −3 to 3.

Any layer exhibiting light-shielding property may be used as the light-shielding layer, and the light-shielding layer may be a base material such as a film base material, a pressure-sensitive adhesive layer, a resin layer such as a film layer, an ink layer such as a printed layer, or the like. Among all, a black film base material and a black printed layer are preferred.

In the case where the light-shielding layer is a base material (film base material) or a pressure-sensitive adhesive layer, it is possible to form a light-shielding layer (for example, a light-shielding base material) by adding a colorant showing black to any one of the layers described later in this specification when forming the layer.

As the colorant showing black, other than a black colorant, a colorant mixture obtained by mixing colorants selected from the black colorant, a cyan colorant (blue green colorant), a magenta colorant (reddish violet colorant), and a yellow colorant (yellow colorant) may be used.

The black colorant may be any colorant (coloring agent) such as a pigment or a dye, and the pigment may be used advantageously. Specific examples of the black colorant include carbon black (furnace black, channel black, acetylene black, thermal black, lamp black, etc.), graphite (black lead), copper oxide, manganese dioxide, aniline black, perylene black, titanium black, cyanine black, activated carbon, ferrite (non-magnetic ferrite, magnetic ferrite, etc.), magnetite, chrome oxide, iron oxide, molybdenum disulfide, chrome complex, complex oxide-based black pigment, and anthraquinone-based organic black pigment. These black colorants may be used alone or in combination of two or more. Among all, carbon black is preferred from the view point of easy availability and cost.

In the cyan colorant, examples of pigment (cyan pigment) include C. I. Pigment Blue 1, 2, 3, 15, 15:1, 1151:2, 15:3, 15:4, 15:5, 15:6, 16, 17, 17:1, 18, 22, 25, 56, 60, 63, 65, and 66; C. I. Vat Blue 4 and 60; and C. I. Pigment Green 7. Further, in the cyan colorant, examples of dye (cyan dye) include C. I. Solvent Blue 25, 36, 60, 70, 93, and 95; and C. I. Acid Blue 6 and 45.

In the magenta colorant, examples of pigment (magenta pigment) include C.I. Pigment Red 1, 2, 3, 4, 5, 6, 7, 8, 9, 10, 11, 12, 13, 14, 15, 16, 17, 18, 19, 21, 22, 23, 30, 31, 32, 37, 38, 39, 40, 41, 42, 48:1, 48:2, 48:3, 48:4, 49, 49:1, 50, 51, 52, 52:2, 53:1, 54, 55, 56, 57:1, 58, 60, 60:1, 63, 63:1, 63:2, 64, 64:1, 67, 68, 81, 83, 87, 88, 89, 90, 92, 101, 104, 105, 106, 108, 112, 114, 122, 123, 139, 144, 146, 147, 149, 150, 151, 163, 166, 168, 170, 171, 172, 175, 176, 177, 178, 179, 184, 185, 187, 190, 193, 202, 206, 207, 209, 219, 222, 224, 238, and 245; C.I. Pigment Violet 3, 9, 19, 23, 31, 32, 33, 36, 38, 43, and 50; and C.I. Vat Red 1, 2, 10, 13, 15, 23, 29, and 35.

Furthermore, in the magenta colorant, examples of dye (magenta dye) include C.I. Solvent Red 1, 3, 8, 23, 24, 25, 27, 30, 49, 52, 58, 63, 81, 82, 83, 84, 100, 109, 111, 121, and 122; C.I. Disperse Red 9; C.I. Solvent Violet 8, 13, 14, 21, and 27; C.I. Disperse Violet 1; C.I. Basic Red 1, 2, 9, 12, 13, 14, 15, 17, 18, 22, 23, 24, 27, 29, 32, 34, 35, 36, 37, 38, 39, and 40; and C.I. Basic Violet 1, 3, 7, 10, 14, 15, 21, 25, 26, 27, and 28.

Still furthermore, in the yellow colorant, examples of pigment (yellow pigment) include C.I. Pigment Orange 31 and 43; C.I. Pigment Yellow 1, 2, 3, 4, 5, 6, 7, 10, 11, 12, 13, 14, 15, 16, 17, 23, 24, 34, 35, 37, 42, 53, 55, 65, 73, 74, 75, 81, 83, 93, 94, 95, 97, 98, 100, 101, 104, 108, 109, 110, 113, 114, 116, 117, 120, 128, 129, 133, 138, 139, 147, 150, 151, 153, 154, 155, 156, 167, 172, 173, 180, 185, and 195; and C.I. Vat Yellow 1, 3, and 20. Further, in the yellow colorant, examples of dye (yellow dye) include C.I. Solvent Yellow 19, 44, 77, 79, 81, 82, 93, 98, 103, 104, 112, and 162.

In the case where the light-shielding layer is an ink layer (printed layer), such light-shielding layer may be formed by coating an ink composition (black ink composition) containing the colorant showing black, a binder as required, a dispersant, a solvent, and the like on a support (such as a base material), optionally followed by drying or curing it.

The binder is not particularly limited, and examples thereof include known resins (thermoplastic resins, thermosetting resins, photocurable resins, etc.) such as a polyurethane resin, a phenolic resin, an epoxy resin, an urea-melamine resin, a silicone resin, a phenoxy resin, a methacrylic resin, an acrylic resin, a polyallylate resin, a polyester resin (such as polyethylene telephthalate), a polyolefin resin (such as polyethylene, polypropylene, and an ethylene-propylene copolymer), a polystyrene resin (such as polystyrene, a styrene-acrylonitrile copolymer, a styrene-butadiene copolymer, a styrene-maleic anhydride copolymer, and an acrylonitrile-butadiene-styrene resin), polyvinyl chloride, a vinyl chloride-vinyl acetate copolymer, polyvinyl acetate, polyvinylidene chloride, polycarbonate, a cellulose (such as a cellulose acetate resin and an ethyl cellulose resin), and polyacetal. These binders may be used alone or in combination of two or more. The solvent may be selected depending on the type of the colorant and the binder.

Examples of a method for forming the ink layer include a conventional coating method, and a method utilizing various printing processes (such as gravure printing, flexographic printing, offset printing, letterpress printing, and screen printing).

In the case where the light-shielding layer is a resin layer (such as a film layer), such light-shielding layer may be formed by molding a resin composition obtained by mixing the colorant showing black with a resin into a sheet by a conventional molding method (such as extrusion molding, inflation molding, and calendar molding, liquid casting), optionally followed by laminating it with another layer (such as a base material layer).

Examples of the resin include polyester (such as polyethylene telephthalate, polyethylene naphthalate, polybutylene telephthalate, and polybutylene naphthalate), polyolefin (such as polyethylene, polypropylene, an ethylene-propylene copolymer), polyvinyl alcohol, polyvinylidene chloride, polyvinyl chloride, a vinyl chloride-vinyl acetate copolymer, polyvinyl acetate, polyamide, polyimide, cellulose, a fluorinated resin, polyether, a polystyrene resin (such as polystyrene), polycarbonate, and polyethersulfone. These resins may be used alone or in combination of two or more.

The resin composition may optionally contain known additives such as a filler, a flame retardant, an anti-aging agent, an antistatic, a softener, an ultraviolet absorber, an antioxidant, a plasticizer, and a surfactant.

In the present invention, the light-shielding layer may be in the form of a single layer or a multilayer, and, in the case where the light-shielding layer is an ink layer, the ink layer may preferably have a multilayer form. By forming the light-shielding layer to have a multilayer structure, it is possible to further improve the light-shielding property of the light-shielding layer. When the light-shielding layer has a multilayer form, the number of layers in the light-shielding layer of 2 or more is sufficient. The number of layers may be selected from 2 to 10 and may preferably be 2 to 8, more preferably 2 to 5, particularly preferably 3.

A thickness of the light-shielding layer (a thickness of whole layers in the case where the light-shielding layer has a multilayer structure) is not particularly limited but may preferably be 5 to 45 μm, more preferably 10 to 40 μm. In the case where the light-shielding layer is an ink layer (a light-shielding printed layer), a thickness of the light-shielding printed layer may preferably be 1 to 20 μm, more preferably 2 to 15 μm.

When the thickness is less than the above-specified range, sufficient light-shielding property is not achieved in some cases. On the other hand, when the thickness exceeds the above-specified range, it is undesirable from the view point of thickness reduction of the pressure-sensitive adhesive sheet.

White or Silver Layer

In the pressure-sensitive adhesive sheet of the invention, a white or silver layer is provided between the light-shielding layer and a colored layer described later. The white or silver layer has a role of separating influence of the light-shielding layer by reflecting light made incident to a surface on a colored layer side to thereby prevent the light from being absorbed by the light-shielding layer. Accordingly, the colored layer and a color of the decoration film provided on the colored layer are seen brighter. In the case where the white or silver layer is not provided, since the light made incident from the colored layer side is absorbed by the light-shielding layer, the black color of the light-shielding layer is seen through. Therefore, the colored layer on the surface and the color of the decoration film in the case where the decoration film is attached to the colored layer are darkened to deteriorate the design.

Examples of such white or silver layer in the invention include a layer showing white or silver. As used herein, white basically means a whitish color having $L^*$ defined in $L^*a^*b^*$ color space of 75 or more (75 to 100), preferably 80 or more (80 to 100), more preferably 85 or more (85 to 100). Each of $a^*$ and $b^*$ defined in the $L^*a^*b^*$ color space may appropriately be selected depending on the value of $L^*$. For example, it is preferable that each of $a^*$ and $b^*$ is within a range of from −10 to 10 (particularly from −5 to 5), more preferably 0 or about 0 (within a range of from −2 to 2).

As used herein, silver basically means a silver color having $L^*$ defined in $L^*a^*b^*$ color space of 70 to 90, preferably from 72 to 88, more preferably 75 to 85.

Each of $a^*$ and $b^*$ defined in the $L^*a^*b^*$ color space may appropriately be selected depending on the value of $L^*$. For example, it is preferable that each of $a^*$ and $b^*$ is within a range of from −10 to 10 (particularly from −5 to 5), and more preferably 0 or about 0 (within a range of from −2 to 2).

A reflectance of the white or silver layer of the pressure-sensitive adhesive sheet in the invention is not particularly limited but may preferably be 60% or more (60% to 100%), more preferably 70% or more, particularly preferably 80% or more.

The white or silver layer may be a base material (film base material) or a pressure-sensitive adhesive layer or may be any one of a resin layer (such as a film layer), an ink layer (such as a printed layer), a metal vapor deposition layer, and the like. Among all, the white printed layer is preferred.

The white or silver layer may be formed in the same manner as in the light-shielding layer except for using a colorant showing white (white colorant) or a colorant showing silver (silver colorant). The white colorant and the silver colorant may be any colorant (coloring agent) such as a pigment and a dye, and the pigment may be used advantageously.

Specific examples of the white colorant include an inorganic white colorant such as titanium oxide (titanium dioxide such as rutile type titanium dioxide, anatase type titanium dioxide, etc.), zinc oxide, aluminum oxide, silicon oxide, zirconium oxide, magnesium oxide, calcium oxide, tin oxide, barium oxide, cesium oxide, yttrium oxide, magnesium carbonate, calcium carbonate (light calcium carbonate, heavy calcium carbonate, etc.), barium carbonate, zinc carbonate, aluminum hydroxide, calcium hydroxide, magnesium hydroxide, zinc hydroxide, aluminum silicate, magnesium silicate, calcium silicate, barium sulfate, calcium sulfate, barium stearate, zinc oxide, zinc sulfide, talc, silica, alumina, clay, kaolin, titanium phosphate, mica, gypsum, white carbon, diatomaceous earth, bentonite, lithopone, zeolite, sericite, and hydrated halloysite; and an organic white colorant such as acrylic resin particles, polystyrene resin particles, polyurethane resin particles, amide resin particles, polycarbonate resin particles, silicone resin particles, urea-formalin resin particles, and melamine resin particles. As the white colorant, also usable is a fluorescent whitening agent, which can be suitably selected among those already known. These white colorants may be used alone or in combination of two or more.

Examples of the silver colorant include silver and aluminum. These silver colorants may be used alone or in combination of two or more.

In the case where the white or silver layer is the metal vapor deposition layer, such layer may be formed by employing a vapor deposition method using a metal component capable of showing a silver-like color, such as silver and aluminum. As the vapor deposition method, it is possible to employ a reduced pressure vapor deposition method (vacuum vapor deposition), a physical sputtering method, a chemical sputtering method, and the like.

The white or the silver layer may be in the form of a single layer or a multilayer but may preferably have a multilayer form from the viewpoint of shielding the influence of the light-shielding layer that is an underlayer. In the case of the multilayer form, the number of layers of 2 or more is sufficient. The number of layers may be selected from 2 to 10 and may preferably be 2 to 8, more preferably 2 to 4, particularly preferably 2.

A thickness of the white or silver layer (a thickness of whole layers in the case where the white or silver layer has a multilayer structure) is not particularly limited but may preferably be 0.001 to 10 μm, more preferably 0.005 to 8 μm. In the case where the white or silver layer is an ink layer (white or silver printed layer), a thickness of the white or silver layer may preferably be 0.05 to 10 μm, more preferably 0.1 to 8 μm. In the case where the white or silver layer is the metal vapor deposition layer, a thickness of the white or silver layer may preferably be 0.001 to 2 μm, more preferably 0.005 to 1 μm. When the thickness is less than the above-specified range, it is difficult to satisfactorily shield the influence of the light-shielding layer in some cases, thereby darkening the colored layer surface or the decoration film surface to be attached to the colored layer to result in deterioration of decorativity. On the other hand, when the thickness exceeds the above-specified range, it is undesirable from the view point of thickness reduction of the pressure-sensitive adhesive sheet.

The white or silver layer may be used as a reflective layer (such as a reflective base material, a reflective printed layer, or a reflective pressure-sensitive adhesive layer) exhibiting the reflectivity without limitation to the use as a part of the laminated structure of the invention. In the case of providing the pressure-sensitive adhesive sheet of the invention with a reflective layer, the reflective layer may preferably be provided on the side of the light-shielding layer that is opposite to the side on which the colored layer is provided.

Colored Layer

In the pressure-sensitive adhesive sheet of the invention, a colored layer is provided on the side of the white or silver layer that is opposite to the side on which the shielding layer is provided. The colored layer has a role of expressing a color such as blue and red on a surface of the pressure-sensitive adhesive sheet. Therefore, when the pressure-sensitive adhesive sheet of the invention is attached to a housing of a mobile phone or the like with the colored layer facing to the outside, the pressure-sensitive adhesive sheet itself can be used as a decoration sheet imparting decorativity. Further, when a decoration film is further attached on the colored layer via the pressure-sensitive adhesive layer, it is possible to make a color of the decoration film more brighter to thereby improve decorativity of the decoration film.

As the colored layer in the invention, a layer showing a color other than black, white, and silver, such as a layer showing red, blue, yellow, green, yellow green, orange, purple, or gold, may be used. The color of the colored layer may preferably have L* defined in L*a*b* color space of 30 or more, more preferably 35 or more, still more preferably 40 or more. When L* is less than 30, the color is darkened to deteriorate the surface decorativity in some cases. C* may preferably be 3 or more, more preferably 5 or more, still more preferably 7 or more, from the view point of decorativity. As used herein, C* is an ab chroma set forth in JIS Z 8729 and defined as $C^* = \{(a^*)^2 + (b^*)^2\}^{1/2}$ The colored layer may be a base material (film base material) or a pressure-sensitive adhesive layer, or may be any one of a resin layer (such as a film layer), an ink layer (such as a printed layer), a metal vapor deposition layer, and the like. Among all, the colored printed layer is preferred.

The colored layer may be formed in the same manner as in the light-shielding layer except for changing the colorant. The colorant to be used for the colored layer is not particularly limited insofar as the above colorings are achieved, and the above-described cyan colorant, magenta colorant, yellow colorant, black colorant, white colorant, silver colorant, and the like may be used alone, or a colorant mixture obtained by mixing a plurality of colorants including colorants other than those described above may be used. The colorant may be any colorant (coloring agent) such as a pigment and a dye, and the pigment may be used advantageously.

As the colorant (colorant mixture) to be used for the colored layer, especially in the case where the white or silver layer is a thin film, it is preferable to add a white or silver colorant considering the effect of the white or silver layer and from the view point of diminishing influence of the light-shielding layer. An amount of the colorant to be added may preferably 40 to 95 wt %, more preferably 50 to 90 wt % based on the total weight of the colorant mixture.

The colored layer may be in the form of a single layer or a multilayer, and, in the case where the colored layer has a multilayer form, the number of layers of 2 or more is sufficient. The number of layers may be selected from 2 to 10 and may preferably be 2 to 6, more preferably 2 to 4, particularly preferably 2.

A thickness of the colored layer (a thickness of whole layers in the case where the colored layer has a multilayer structure) is not particularly limited but may preferably be 0.1 to 5 μm, more preferably 0.5 to 3 μm. When the thickness is less than the above-specified range, bright color is not expressed in some cases due to influence of a base layer. On the other hand, when the thickness exceeds the above-specified range, it is undesirable from the view point of thickness reduction of the pressure-sensitive adhesive sheet.

Laminated Structure

It is necessary that the light-shielding layer, the white or silver layer, and the colored layer form a laminated structure in which the light-shielding layer, the white or silver layer, and the colored layer are laminated in this order. These layers may directly be laminated on one another without inserting another layer between them, but the layers may be laminated through another layer such as an adhesive layer insofar as the layers are laminated in the above-specified order. The "another layer" described above does not include the light-shielding layer, the white or silver layer, and the colored layer.

In the case where each of the light-shielding layer, the white or silver layer, and the colored layer has a multilayer structure, it is sufficient that whole of each layer constituted of the multilayer has the above-mentioned properties of each layer. For example, in the case of the light-shielding layer, the multilayer-structured light-shielding layer as a whole satisfies the above-described properties of the light-shielding layer (black layer). Each of the multilayer-structured layers (e.g. light-shielding layer) generally has a structure in which a plurality of layers (constituent layers) having identical composition are laminated, but constituent layers having different compositions may be laminated. In the case of using the constituent layers of different compositions, it is preferable that the constituent layers to be used have such a property that it is possible to form each of the above-mentioned layers (e.g. light-shielding layer) by using a plurality of each of the constituent layers. Specifically, in the case where the light-shielding layer is formed of a constituent layer 1 and a constituent layer 2 that are different in composition, it is preferable that the requirements as the light-shielding layer are satisfied when a plurality of the constituent layers 1 (or 2) are laminated.

Further, a part where the white layer and the silver layer are successively formed (e.g. white layer/white layer/silver layer) is referred to as "white or silver layer" as a whole.

A thickness of the laminated structure part (a total thickness of the light-shielding layer, the white or silver layer, and the colored layer) of the pressure-sensitive adhesive sheet according to the invention may preferably be 1 to 30 μm, more preferably 5 to 25 μm. The invention is advantageous since it is possible to realize both of the light-shielding property and the surface decorativity even when the thickness of the laminated structure part is in the above-specified relatively thin range. Actual advantage of the invention can be diminished when the thickness of the laminated structure part is set to the range exceeding 30 μm. Further, such a large thickness is undesirable from the view point of thickness reduction.

Base Material

In the case where the pressure-sensitive adhesive sheet of the invention has a base material, the base material is not particularly limited, and various base materials may be used. For example, an appropriate thin material, for example, a fiber base material such as a cloth, a non-woven cloth, a felt, a net; a paper base material such as various papers; a metal base material such as a metal foil and a metal plate; a plastic base material such as a film and a sheet made from various resins; a rubber base material such as a rubber sheet, a foamed material such as a foamed sheet; a laminated material thereof; and the like may be used. Examples of materials and raw materials of the plastic base material include polyester (such as polyethylene telephthalate, polyethylene naphthalate, polybutylene telephthalate, and polybutylene naphthalate), polyolefin (such as polyethylene, polypropylene, and an ethylene-propylene copolymer), polyvinyl alcohol, polyvinylidene chloride, polyvinyl chloride, a vinyl chloride-vinyl acetate copolymer, polyvinyl acetate, polyamide, polyimide, cellulose, a fluorinated resin, polyether, a polystyrene resin (such as polystyrene), polycarbonate, and polyethersulfone. The base material may be in the form of a single layer or a multilayer.

A thickness of the base material is not particularly limited but may preferably be 1 to 30 μm, more preferably 4 to 25 μm, from the view point of thickness and weight reduction as well as processability.

The base material may contain the above-described colorant (such as black colorant, white colorant, silver colorant, cyan colorant, magenta colorant, and yellow colorant) to be used as a light-shielding layer (light shielding base material), a white or silver layer (white or silver base material), or a colored layer (colored base material), thereby constituting a part of the laminated structure. Further, the base material may not constitute the laminated structure and, in such a case, it may be a base material having a transparency (transparent base material).

A conventional surface treatment such as a chromic acid treatment, ozone exposure, flame exposure, high high-voltage electrical shock exposure, and an oxidization treatment employing a chemical or physical method, such as ionizing radiation treatment, may be optionally performed on a surface of the base material.

As the base material in the invention, a highly adhesive base material such as a base material made from a polymer having high polarity, e.g., a polyester, and a base material subjected to the oxidization treatment or the like is preferred among the above-described base materials.

Pressure-Sensitive Adhesive Layer

The pressure-sensitive adhesive sheet of the invention has at least one pressure-sensitive adhesive layer as at least one surface layer. Incidentally, the pressure-sensitive adhesive sheet may be a double-sided pressure-sensitive adhesive sheet in which both surface layers are pressure-sensitive adhesive layers. Particularly, in the case where the pressure-sensitive adhesive sheet is used for mobile phones, such as in the case of attaching a decoration film or the like to a housing of a mobile phone or the like, the double-sided pressure-sensitive adhesive sheet is preferred.

A pressure-sensitive adhesive to be used for forming the pressure-sensitive adhesive layer used in the pressure-sensitive adhesive sheet of the invention is not particularly limited, and examples thereof include known pressure-sensitive adhesives such as an urethane pressure-sensitive adhesive, an acrylic pressure-sensitive adhesive, a rubber pressure-sensitive adhesive, a silicone pressure-sensitive adhesive, a polyester pressure-sensitive adhesive, a polyamide pressure-sensitive adhesive, an epoxy pressure-sensitive adhesive, a vinylalkylether pressure-sensitive adhesive, and a fluorinated pressure-sensitive adhesive. These pressure-sensitive adhesives may be used alone or in combination of two or more. The pressure-sensitive adhesive may be of any form, and it may be, for example, an emulsion type pressure-sensitive adhesive, a solvent type pressure-sensitive adhesive, and a thermally fusible (hot-melt type) pressure-sensitive adhesive.

As the pressure-sensitive adhesive, an acrylic pressure-sensitive adhesive or a rubber pressure-sensitive adhesive may be used advantageously. The acrylic pressure-sensitive adhesive contains an acrylic polymer as a principal component or a base polymer. The acrylic polymer is not particularly limited, but it is preferable that a alkylester(meth)acrylate (alkylester acrylate or alkylester methacrylate) is used as a principally constituting monomer component (principal monomer component).

Specific examples of the alkylester(meth)acrylate include methyl(meth)acrylate, ethyl(meth)acrylate, propyl(meth)acrylate, isopropyl(meth)acrylate, butyl(meth)acrylate, isobutyl(meth)acrylate, s-butyl(meth)acrylate, t-butyl(meth)acrylate, pentyl(meth)acrylate, isoamyl(meth)acrylate, neopentyl(meth)acrylate, hexyl(meth)acrylate, heptyl(meth)acrylate, 2-ethylhexyl(meth)acrylate, octyl(meth)acrylate, isooctyl (meth)acrylate, nonyl(meth)acrylate, isononyl(meth)acrylate, decyl(meth)acrylate, isodecyl(meth)acrylate, undecyl(meth)acrylate, and dodecyl(meth)acrylate. These alkylester(meth)acrylates may be employed alone or in combination of two or more.

As the monomer component forming the acrylic polymer, another monomer component capable of copolymerizing with alkylester(meth)acrylate may also be used insofar as alkylester(meth)acrylate is employed as the principal monomer component (also referred to as "copolymerizable monomer component" in some cases). Alkylester(meth)acrylate may preferably be used in a proportion of 50 wt % or more, with respect to all the monomer components constituting the acrylic polymer. When the amount of the alkylester(meth)acrylate is less than 50 wt % with respect to all the monomer components constituting the acrylic polymer, it may be difficult to exhibit the characteristics (such as adhesiveness) of the acrylic polymer.

The copolymerizable monomer component may be used in order for introducing a crosslinking site into the acrylic polymer or for improving the cohesive power of the acrylic polymer. The copolymerizable monomer component may be used alone or in combination of two or more.

More specifically, as the copolymerizable monomer component, for the purpose of introducing a crosslinking site into the acrylic polymer, a functional group-containing monomer component (particularly a thermally crosslinking functional group-containing monomer component for introducing a thermal crosslinking site into the acrylic polymer) may be used. Such functional group-containing monomer component may be, without particular limitation, any monomer component that can copolymerize with alkylester(meth)acrylate and that has a functional group providing a crosslinking site, and examples thereof include a carboxyl group-containing monomer such as (meth)acrylic acid, itaconic acid, crotonic acid, maleic acid, fumaric acid, isocrotonic acid, and anhydride thereof (such as maleic anhydride and itaconic anhydride); a hydroxide group-containing monomer such as hydroxyalkyl(meth)acrylate including 2-hydroxyethyl (meth)acrylate, 2-hydroxypropyl(meth)acrylate, 2-hydroxybutyl(meth)acrylate, and the like, vinyl alcohol, and allyl alcohol; an amide monomer such as (meth)acrylamide, N,N-dimethyl(meth)acrylamide, N-butyl(meth)acrylamide, N-methylol (meth)acrylamide, N-methylolpropane(meth) acrylamide, N-methoxymethyl (meth)acrylamide, and N-butoxymethyl(meth)acrylamide; an amino group-containing monomer such as aminoethyl(meth)acrylate, N,N-dimethylaminoethyl(meth)acrylate, and t-butylaminoethyl(meth) acrylate; an epoxy group-containing monomer such as glycidyl(meth)acrylate, and methylglycidyl(meth)acrylate; a cyano group-containing monomer such as acrylonitrile and methacrylonitrile; and a monomer having a nitrogen-containing ring, such as N-vinyl-2-pyrrolidone, N-methylvinylpyrrolidone, N-vinylpyridine, N-vinylpiperidone, N-vinylpyrimidine, N-vinylpiperazine, N-vinylpyrazine, N-vinylpyrrole, N-vinylimidazole, N-vinyloxazole, N-vinylmorpholine, N-vinylcaprolactam, and N-(meth)acryloylmorpholine. As the functional group-containing monomer, a carboxyl group-containing monomer such as acrylic acid and an acid anhydride thereof may be used advantageously.

Also, as the copolymerizable monomer component, another copolymerizable monomer component may be used for the purpose of increasing the cohesive power of the acrylic polymer. Examples of such another copolymerizable monomer component include a vinyl ester monomer such as vinyl acetate and vinyl propionate; a styrene monomer such as styrene, substituted styrene (e.g. α-methylstyrene, etc.), and vinyltoluene; non-aromatic ring-containing ester(meth)acrylate such as (meth)acrylic acid cycloalkylester (e.g. cyclohexyl(meth)acrylate, cyclopentyl di(meth)acrylate, etc.), bornyl(meth)acrylate, and isobornyl (meth)acrylate; aromatic ring-containing ester (meth)acrylate such as (meth) acrylic acid aryl ester (e.g. phenyl(meth)acrylate, etc.), (meth)acrylic acid aryloxyalkylester (e.g. phenoxyethyl (meth)acrylate, etc.), and (meth)acrylic acid arylalkylester (e.g. benzyl(meth)acrylate, etc.); an olefinic monomer such as ethylene, propylene, isoprene, butadiene, and isobutylene; vinyl chloride, vinylidene chloride; an isocyanate group-containing monomer such as 2-(meth)acryloyloxyethyl isocyanate; an alkoxy group-containing monomer such as methoxyethyl(meth)acrylate and ethoxyethyl(meth)acrylate; a vinylether monomer such as methylvinylether and ethylvinylether; and a polyfunctional monomer such as 1,6-hexanediol di(meth)acrylate, ethyleneglycol di(meth)acrylate, diethyleneglycol di(meth)acrylate, triethyleneglycol di(meth)acrylate, tetraethyleneglycol di(meth)acrylate, (poly)ethyleneglycol di(meth)acrylate, propyleneglycol di(meth)acrylate, (poly)propyleneglycol di(meth)acrylate, neopentylglycol di(meth)acrylate, pentaerythritol di(meth) acrylate, trimethylolpropane tri(meth)acrylate, pentaerythritol tri(meth)acrylate, dipentaerythritol hexa(meth)acrylate, glycerin di(meth)acrylate, epoxy acrylate, polyester acrylate, urethane acrylate, divinylbenzene, butyl di(meth)acrylate, and hexyl di(meth)acrylate; and the like.

Examples of the rubber pressure-sensitive adhesive include those containing, as a base polymer, a rubber component such as a natural rubber, a styrene-isoprene-styrene block copolymer (SIS block copolymer), a styrene-butadiene-styrene block copolymer (SBS block copolymer), a styrene-ethylene/butylene-styrene block copolymer (SEBS block copolymer), a styrene-butadiene rubber, polybutadiene, polyisoprene, a polyisobutylene, a butyl rubber, a chloroprene rubber, a silicone rubber, an acrylonitrile-butadiene rubber, and ethylene-propylene terpolymer.

The pressure-sensitive adhesive may optionally contain various known additives such as a crosslinking agent, a cross bonding agent, a tackifier resin, a filler, a flame retardant, an anti-aging agent, an antistatic, a softener, an ultraviolet absorber, an antioxidant, a plasticizer, and a surfactant. Also, thermally expandable microspheres may be added. In such a case, the pressure-sensitive adhesive layer serves as a heat-peelable pressure-sensitive adhesive layer.

The pressure-sensitive adhesive layer may have a single layer or multilayer structure.

The pressure-sensitive adhesive layer may be used as a light-shielding pressure-sensitive adhesive layer having a role of the light-shielding layer when the colorant showing black is added thereto in an amount within the range that does not impair the effect of the invention. Further, the pressure-sensitive adhesive layer may be used as a colored pressure-sensitive adhesive layer having a role of the colored layer when the various colorants (such as black colorant, white colorant, silver colorant, cyan colorant, magenta colorant, and yellow colorant) are added thereto. In such a case, the pressure-sensitive adhesive layer may constitute a part of the laminated structure. In the case where the pressure-sensitive adhesive layer does not constitute the laminated structure, the pressure-sensitive adhesive layer may preferably have transparency (transparent pressure-sensitive adhesive layer).

A thickness of the pressure-sensitive adhesive layer is not particularly limited but may preferably be 1 to 25 μm, more preferably 2 to 15 μm, from the view point of thickness reduction of the pressure-sensitive adhesive sheet.

A method for forming the pressure-sensitive adhesive layer is not particularly limited, and the pressure-sensitive adhesive layer may be formed, for example, by a method of coating a pressure-sensitive adhesive on a predetermined surface, followed by an optional drying or curing, or a method of coating a pressure-sensitive adhesive on a separator (peel-off liner), followed by an optional drying or curing to obtain an adhesive layer, and transferring such pressure-sensitive adhesive layer by adhesion onto a predetermined surface. For coating the pressure-sensitive adhesive, a common coating equipment (such as a gravure roll coater, a reverse roll coater, a kiss roll coater, a dip roll coater, a bar coater, a knife coater, and a spray coater) may be used.

Pressure-Sensitive Adhesive Sheet

As mentioned above, the pressure-sensitive adhesive sheet of the invention is not particularly limited so long as it has at least one pressure-sensitive adhesive layer as at least one surface layer and includes therein a laminated structure in which a light-shielding layer, a white or silver layer, and a colored layer are laminated in this order. Among all, the following specific structures may be mentioned:

(1) transparent pressure-sensitive adhesive layer/transparent base material/light-shielding printed layer/white or silver printed layer/colored printed layer;

(2) transparent pressure-sensitive adhesive layer/transparent base material/light-shielding printed layer/white or silver printed layer/colored printed layer/transparent pressure-sensitive adhesive layer;

(3) transparent pressure-sensitive adhesive layer/white base material (reflective base material)/light-shielding printed layer/white or silver printed layer/colored printed layer;

(4) transparent pressure-sensitive adhesive layer/white base material (reflective base material)/light-shielding printed layer/white or silver printed layer/colored printed layer/transparent pressure-sensitive adhesive layer; and (5) transparent pressure-sensitive adhesive layer/white base material (reflective base material)/white or silver printed layer/light-shielding printed layer/white or silver printed layer/colored printed layer/transparent pressure-sensitive adhesive layer.

Among all, a particularly preferred structure is (5). In each of the structures of (3) to (5), a pressure-sensitive adhesive sheet (light reflective/shielding pressure-sensitive adhesive sheet) having reflectivity and light-shielding property is obtained.

As described above, the pressure-sensitive adhesive sheet of the invention may have a structure including a pressure-sensitive adhesive layer only on one surface thereof or a structure including pressure-sensitive adhesive layers on both surfaces thereof. Further, the pressure-sensitive adhesive sheet may have a lamination form of sheet-like members or a form wound in a roll.

In the pressure-sensitive adhesive sheet of the invention, a surface of the pressure-sensitive adhesive layer may be protected by a known separator (peel-off liner). Further, in the case where the pressure-sensitive adhesive sheet has a structure in which the pressure-sensitive adhesive layer is formed only on one side thereof, the surface of the pressure-sensitive adhesive layer may be protected by forming a peel-off treatment layer treated with a known peel-off treatment agent (such as a silicone peel-off treatment agent) on a side (back side) opposite to the pressure-sensitive adhesive layer side and winding the pressure-sensitive adhesive sheet in the form of a roll in which the peel-off treatment layer and the adhesive layer contact with each other.

A transmittance (at wavelength of 550 nm) of the pressure-sensitive adhesive sheet of the invention may be 0.3% or less (0 to 0.3%), more preferably 0.1% or less, still more preferably 0.05% or less. Among all, the transmittance of 0.03% or less, particularly 0.01% or less, is preferred. When the transmittance exceeds 0.3%, for example, in the case of attaching the pressure-sensitive adhesive sheet to a surface of a mobile phone having an LCD (in the vicinity of the LCD), design of the surface of the pressure-sensitive adhesive sheet or a decoration film to be attached to the surface of the pressure-sensitive adhesive sheet may be deteriorated by stray light from the LCD below them in some cases. The transmittance (%) of the pressure-sensitive adhesive sheet is detected by irradiating one side of a pressure-sensitive adhesive sheet with light having a wavelength of 550 nm and measuring intensity of the light transmitted to the other side of the pressure-sensitive adhesive sheet by using the U-4100 type spectrophotometer which is manufactured by Hitachi High-Technologies Corporation.

L* (luminosity) of at least one surface of the pressure-sensitive adhesive sheet of the invention, which is defined in the L*a*b* color space, may be 30 or more, preferably 35 or more, more preferably 40 or more. When L* is less than 30, the surface of the pressure-sensitive adhesive sheet or a decoration sheet to be attached to the pressure-sensitive adhesive sheet is darkened to deteriorate the design and decorativity. Further, C* (chromaticness) of the above-mentioned surface may be 3 or more, preferably 5 or more, more preferably 7 or more, from the view point of decorativity.

In the present invention, the surface satisfying the ranges of L* and C* generally is the surface on which the colored layer is provided and forms an outer surface in the case where the pressure-sensitive adhesive sheet is attached to a mobile phone or the like. In the case where the decoration sheet is attached, the surface is a surface which contacts with the decoration sheet.

In the present invention, L*, a*, and b* defined in the L*a*b* color space are detected by a measurement with a color difference meter (trade name: CR-200, manufactured by Konica Minolta Holdings, Inc.). C* is a square root of a square sum of a* and b* and represented by the following formula:

$$C^* = \{(a^*)^2 + (b^*)^2\}^{1/2}.$$

The L*a*b* color space is a color space recommended by the Commission Internationale de l'Eclairage (CIE) in 1976 and means a color space called CIE1976 (L*a*b*) color space. Further, the L*a*b* color space is defined in Japanese Industrial Standards by JIS Z 8729.

In the case where the pressure-sensitive adhesive sheet of the invention is a light reflective/shielding pressure-sensitive adhesive sheet having a reflective layer, reflectance of a surface on the side having the reflective layer (such as a reflective base material) may preferably be 60% or more (e.g. 60% to 100%), more preferably 70% or more, still more preferably 80% or more. Owing to the reflective layer, it is possible to reduce the transmitting light as well as to exhibit excellent light-shielding property with a relatively thin light-shielding layer.

A thickness of the pressure-sensitive adhesive sheet (excluding separator) is not particularly limited but may preferably be 10 to 50 μm, more preferably 15 to 45 μm, still more preferably 20 to 40 μm. A thickness exceeding 50 μm is disadvantageous for thickness reduction of a mobile phone or the like. When the thickness is less than 10 μm, light-shielding property may be deteriorated due to the excessive thickness reduction of the light-shielding layer, or the property of shielding the influence of the light-shielding layer may be deteriorated due to the excessive thickness reduction of the white or silver layer in some cases.

The pressure-sensitive adhesive sheet of the invention is suitably used for decoration of and attaching and fixing component members of mobile phones, personal digital assistants (PDA), small game consoles, and the like. Among all, the pressure-sensitive adhesive sheet is suitably used as a decoration film imparting designability and decorativity to housings of mobile phones, small game consoles, and the like when attached to the housing or suitably used as a fixing film (double-sided tape) for attaching a decoration film to housings of mobile phones and the like.

Separator

In the pressure-sensitive adhesive sheet of the invention, a separator (peel-off liner) may be provided on the surface of the pressure-sensitive adhesive layer from the view points of protecting the surface of the pressure-sensitive adhesive layer, preventing blocking, and the like. The separator is peeled off when the pressure-sensitive adhesive sheet is attached to an adherend and it is not necessarily be provided. The separator to be used is not particularly limited, and known peel-off paper and the like may be used. For example, a base material having a peel-off layer of a plastic film or paper that is surface-treated with a peel-off agent such as a silicone-based peel-off agent, a long chain alkyl-based peel-off agent, a fluorine-based peel-off agent, and a molybdenum sulfide; a slightly adhesive base material made from a fluorine-based polymer such as polytetrafluoroethylene, polychlorotrifluoroethylene, polyvinyl fluoride, polyvinylidene fluoride, a tetrafluoroethylene/hexafluoropropylene copolymer, and a chlorofluoroethylene/vinylidene fluoride copolymer; a slightly adhesive base material made form a non-polar polymer such as an olefin-based resin (e.g. polyethylene, polypropylene, etc.); and the like may be used. In the case where the pressure-sensitive adhesive sheet of the invention has no base material, the separator has a role of a support base material for the pressure-sensitive adhesive layer.

In the case of the double-sided pressure-sensitive adhesive tape, separators may be provided on both of the pressure-sensitive adhesive surfaces. Alternatively, a separator having a back surface peel-off layer may be provided on one pressure-sensitive adhesive surface, so that the back surface peel-off layer is brought into contact with the other pressure-sensitive adhesive surface when the sheet is wound.

Physical Property Measurement Method and Effect Evaluation Method

Hereinafter, examples of a measurement method and an effect evaluation method employed in the invention will be described.

(1) $L^*$, $a^*$, $b^*$, $C^*$ (Reflected Color Tone)

$L^*$, $a^*$, and $b^*$ defined in the $L^*a^*b^*$ color space were detected by a measurement with a color difference meter (trade name: CR-200, manufactured by Konica Minolta Holdings, Inc.). $C^*$ was calculated from a square root of a square sum of $a^*$ and $b^*$. The measurement was conducted by placing a SUS (BA) plate under a sample.

(2) Transmittance

A transmittance (%) was determined by irradiating one side of the pressure-sensitive adhesive sheet with light having a wavelength of 550 nm and measuring intensity of light transmitted to the other side by using the U-4100 type spectrophotometer manufactured by Hitachi High-Technologies Corporation.

The measurement was performed after the peel-off liner was detached.

(3) Reflectance

Reflectance (%) was measured by irradiating a surface of the pressure-sensitive adhesive sheet with light having a wavelength of 550 nm and measuring intensity of light reflected at the surface irradiated with the light by using the U-4100 type spectrophotometer manufactured by Hitachi High-Technologies Corporation.

In Examples and Comparative Examples, reflectance of a surface on a white PET film side was measured.

(4) Tape Thickness

Measurements were conducted by using a 0.001 mm-dial gauge manufactured by Ozaki MFG. Co., Ltd.

EXAMPLES

Hereinafter, the invention will be described in more details based on examples, but this invention is not restricted by the examples at all. Evaluation results of Examples and Comparative Examples are shown in Table 1.

(Acrylic Pressure-Sensitive Adhesive)

To a reactor provided with a thermometer, a stirring machine, a nitrogen introduction piping, and reflux cooling piping, 70 parts by weight of n-butyl acrylate, 27 parts by weight of 2-ethylhexyl acrylate, 3 parts by weight of acrylic acid, 0.2 part by weight of azobisisobutylonitrile, and 235 parts by weight of ethyl acetate as a polymerization solvent were fed, followed by stirring for 1 hour while introducing a nitrogen gas. After removing oxygen in the polymerization system, a temperature was raised to 63° C. for a reaction for 10 hours. After that, the temperature was cooled to a room temperature to obtain an acrylic polymer solution having a solid concentration of 30 wt %. To 100 parts by weight (in solid content) of the acrylic polymer solution, 0.05 part by weight of a 4-functional epoxy crosslinking agent (manufactured by Mitsubishi Gas Chemical Company, Inc.) was added to prepare a transparent acrylic pressure-sensitive adhesive.

Example 1

On one side of a white polyethylenetelephthalate (PET) film (a tetron film "TU3#13", thickness: 13 μm; manufactured by Teijin DuPont Films Japan Limited), multilayer printing of white/silver/black/black/black/white/white/red was performed in this order by using inks (NB-300; manufactured by Dainichiseika Color & Chemicals Mfg. Co. Ltd.) in accordance with a gravure printing method to obtain a base material having a thickness of 24 μm. The acrylic pressure-sensitive adhesive obtained as described above was coated on both sides of the base material in such a manner that the thicknesses of the pressure-sensitive adhesive layers became 5 μm to obtain a double-sided adhesive tape (double-sided pressure-sensitive adhesive sheet) having a thickness of 34 μm.

Note that "white", "black", and the like described above are types of the printing inks, and details thereof will be described later.

A structure of the double-sided pressure-sensitive adhesive sheet was: transparent pressure-sensitive adhesive layer/white base material (PET film)/white or silver printed layer (two layers)/light-shielding printed layer (three layers)/white printed layer (two layers)/colored printed layer/transparent pressure-sensitive adhesive layer.

Example 2

On one side of a white polyethylenetelephthalate (PET) film (a tetron film "TU3#13", thickness: 13 μm; manufactured by Teijin DuPont Films Japan Limited), multilayer printing of white/silver/black/black/black/white/white/pink was performed in this order by using inks (NB-300; manufactured by Dainichiseika Color & Chemicals Mfg. Co. Ltd.) in accordance with a gravure printing method to obtain a base material having a thickness of 24 μm. The acrylic pressure-sensitive adhesive obtained as described above was coated on both sides of the base material in such a manner that the thicknesses of the pressure-sensitive adhesive layers became 5 μm to obtain a double-sided adhesive tape (double-sided pressure-sensitive adhesive sheet) having a thickness of 34 μm.

Example 3

On one side of a white polyethylenetelephthalate (PET) film (a tetron film "TU3#13", thickness: 13 μm; manufactured by Teijin DuPont Films Japan Limited), multilayer printing of white/silver/black/black/black/white/white/dark blue was performed in this order by using inks (NB-300; manufactured by Dainichiseika Color & Chemicals Mfg. Co. Ltd.) in accordance with a gravure printing method to obtain a base material having a thickness of 24 μm. The acrylic pressure-sensitive adhesive obtained as described above was coated on both sides of the base material in such a manner that the thicknesses of the pressure-sensitive adhesive layers became 5 μm to obtain a double-sided adhesive tape (double-sided pressure-sensitive adhesive sheet) having a thickness of 34 μm.

Example 4

On one side of a white polyethylenetelephthalate (PET) film (a tetron film "TU3#13", thickness: 13 μm; manufactured by Teijin DuPont Films Japan Limited), multilayer printing of white/silver/black/black/black/white/white/sky blue was performed in this order by using inks (NB-300; manufactured by Dainichiseika Color & Chemicals Mfg. Co. Ltd.) in accordance with a gravure printing method to obtain a base material having a thickness of 24 μm. The acrylic pressure-sensitive adhesive obtained as described above was coated on both sides of the base material in such a manner that the thicknesses of the pressure-sensitive adhesive layers became 5 μm to obtain a double-sided adhesive tape (double-sided pressure-sensitive adhesive sheet) having a thickness of 34 μm.

Example 5

On one side of a white polyethylenetelephthalate (PET) film (a tetron film "TU3#13", thickness: 13 μm; manufactured by Teijin DuPont Films Japan Limited), multilayer printing of white/silver/black/black/black/silver/red was performed in this order by using inks (NB-300; manufactured by Dainichiseika Color & Chemicals Mfg. Co. Ltd.) in accordance with a gravure printing method to obtain a base material having a thickness of 22 μm. The acrylic pressure-sensitive adhesive obtained as described above was coated on both sides of the base material in such a manner that the thicknesses of the pressure-sensitive adhesive layers became 5 μm to obtain a double-sided adhesive tape (double-sided pressure-sensitive adhesive sheet) having a thickness of 32 μm.

Example 6

On one side of a white polyethylenetelephthalate (PET) film (a tetron film "TU3#13", thickness: 13 μm; manufactured by Teijin DuPont Films Japan Limited), multilayer printing of white/silver/black/black/black/silver/dark blue was performed in this order by using inks (NB-300; manufactured by Dainichiseika Color & Chemicals Mfg. Co. Ltd.) in accordance with a gravure printing method to obtain a base material having a thickness of 22 μm. The acrylic pressure-sensitive adhesive obtained as described above was coated on both sides of the base material in such a manner that the thicknesses of the pressure-sensitive adhesive layers became 5 μm to obtain a double-sided adhesive tape (double-sided pressure-sensitive adhesive sheet) having a thickness of 32 μm.

Comparative Example 1

On one side of a white polyethylenetelephthalate (PET) film (a tetron film "TU3# 13", thickness: 13 μm; manufactured by Teijin DuPont Films Japan Limited), multilayer printing of white/silver/black/black/black/red was performed in this order by using inks (NB-300; manufactured by Dainichiseika Color & Chemicals Mfg. Co. Ltd.) in accordance with a gravure printing method to obtain a base material having a thickness of 21 μm. The acrylic pressure-sensitive adhesive obtained as described above was coated on both sides of the base material in such a manner that the thicknesses of the pressure-sensitive adhesive layers became 5 μm to obtain a double-sided adhesive tape (double-sided pressure-sensitive adhesive sheet) having a thickness of 31 μm.

Comparative Example 2

On one side of a white polyethylenetelephthalate (PET) film (a tetron film "TU3#13", thickness: 13 μm; manufactured by Teijin DuPont Films Japan Limited), multilayer printing of white/silver/black/black/black/dark blue in this order was performed by using inks (NB-300; manufactured by Dainichiseika Color & Chemicals Mfg. Co. Ltd.) in accordance with a gravure printing method to obtain a base material having a thickness of 21 μm. The acrylic pressure-sensitive adhesive obtained as described above was coated on both sides of the base material in such a manner that the thicknesses of the pressure-sensitive adhesive layers became 5 μm to obtain a double-sided adhesive tape (double-sided pressure-sensitive adhesive sheet) having a thickness of 31 μm.

Comparative Example 3

On one side of a white polyethylenetelephthalate (PET) film (a tetron film "TU3#13", thickness: 13 μm; manufactured by Teijin DuPont Films Japan Limited), multilayer printing of white/silver/black/black/black/silver in this order was performed by using inks (NB-300 manufactured by Dainichiseika Color & Chemicals Mfg. Co.

Ltd.) in accordance with a gravure printing method to obtain a base material having a thickness of 21 μm. The acrylic pressure-sensitive adhesive obtained as described above was coated on both sides of the base material in such a manner that the thicknesses of the pressure-sensitive adhesive layers became 5 μm to obtain a double-sided adhesive tape (double-sided pressure-sensitive adhesive sheet) having a thickness of 31 μm.

The printing inks used for the multilayer printing of Examples and Comparative Examples were as follows.

White: NB-300 white; manufactured by Dainichiseika Color & Chemicals Mfg. Co. Ltd.

Silver: NB-300 silver; manufactured by Dainichiseika Color & Chemicals Mfg. Co. Ltd.

Black: NB-300 black; manufactured by Dainichiseika Color & Chemicals Mfg. Co. Ltd.

Red: NB-300 red; manufactured by Dainichiseika Color & Chemicals Mfg. Co. Ltd.

Dark Blue: NB-300 dark blue; manufactured by Dainichiseika Color & Chemicals Mfg. Co. Ltd.

Pink: one obtained by blending NB-300 red and NB-300 white at a weight ratio of 2:8

Sky blue: one obtained by blending NB-300 dark blue and NB-300 white at a weight ratio of 2:8

The following Table 1 describes the results of the measurements about reflected color tone, transmittance, reflectance, and thickness of the double-sided adhesive tapes of Examples 1 to 6 and Comparative Examples 1 to 3.

TABLE 1

|  |  | Ex. 1 | Ex. 2 | Ex. 3 | Ex. 4 | Ex. 5 | Ex. 6 | Comp. Ex. 1 | Comp. Ex. 2 | Comp. Ex. 3 |
|---|---|---|---|---|---|---|---|---|---|---|
| L*a*b* color space (printed layer side) | L* | 35.51 | 43.56 | 36.39 | 49.20 | 37.49 | 44.18 | 25.60 | 23.84 | 60.55 |
| | a* | 35.37 | 32.88 | 6.15 | −7.13 | 30.33 | −5.33 | 2.16 | 3.35 | −0.32 |
| | b* | 0.25 | 0.50 | −39.49 | −36.14 | −2.33 | −30.24 | 3.90 | −2.95 | −0.37 |
| | C* (chromaticness) | 35.37 | 32.88 | 39.97 | 36.84 | 30.42 | 30.71 | 4.46 | 4.46 | 0.49 |
| L*a*b* color space (PET film side) | L* | 87.18 | 87.18 | 87.18 | 87.18 | 87.18 | 87.18 | 87.18 | 87.18 | 87.18 |
| | A* | −0.96 | −0.96 | −0.96 | −0.96 | −0.96 | −0.96 | −0.96 | −0.96 | −0.96 |
| | B* | −3.86 | −3.86 | −3.86 | −3.86 | −3.86 | −3.86 | −3.86 | −3.86 | −3.86 |
| Reflectance on PET film side (% R) (550 nm) | | 74.5 | 74.5 | 74.5 | 74.5 | 74.5 | 74.5 | 74.5 | 74.5 | 74.5 |
| Transmittance (%) (550 nm) | | 0.01 or less | 0.01 or less | 0.01 or less | 0.01 or less | 0.01 or less | 0.01 or less | 0.01 or less | 0.01 or less | 0.01 or less |
| Thickness (mm) | | 0.034 | 0.034 | 0.034 | 0.034 | 0.032 | 0.032 | 0.031 | 0.031 | 0.031 |

While the present invention has been described in detail and with reference to specific embodiments thereof, it will be apparent to one skilled in the art that various changes and modifications can be made therein without departing from the scope thereof.

This application is based on Japanese patent application No. 2007-156005 filed on Jun. 13, 2007, the entire contents thereof being hereby incorporated by reference.

Further, all references cited herein are incorporated in their entireties.

What is claimed is:

1. A pressure-sensitive adhesive sheet comprising:
    a laminated structure in which a light-shielding layer, a white or silver layer, and a colored layer in a color other than black, white, and silver are laminated in this order; and
    at least one pressure-sensitive adhesive layer directly laminated on the colored layer as a surface layer,
    wherein at least one surface of the pressure-sensitive adhesive sheet has L* of 30 or more and C* of 3 or more, in which L* represents a luminosity and C* represents a chromaticness, and
    wherein the pressure-sensitive adhesive sheet as a whole has a transmittance of a light having a wavelength of 550 nm of 0.3% or less.

2. The pressure-sensitive adhesive sheet according to claim 1, wherein the laminated structure has a structure in which a white or silver reflective layer, a light-shielding layer, the white or silver layer, and the colored layer are laminated in this order.

3. The pressure-sensitive adhesive sheet according to claim 1, which has a thickness of 10 to 50 μm.

4. The pressure-sensitive adhesive sheet according to claim 2, which has a thickness of 10 to 50 μm.

5. The pressure-sensitive adhesive sheet according to claim 1, wherein the pressure-sensitive adhesive sheet is a double-sided pressure-sensitive adhesive sheet.

* * * * *